(12) United States Patent
Giguere et al.

(10) Patent No.: US 10,654,968 B2
(45) Date of Patent: May 19, 2020

(54) METHOD OF FORMING AND USE OF A CROSSLINKED POLYMER

(71) Applicant: Sumitomo Chemical Company Limited, Tokyo (JP)

(72) Inventors: Jean-Benoit Giguere, Cambridge (GB); Florence Bourcet, Godmanchester (GB)

(73) Assignee: Sumitomo Chemical Company Limited, Tokyo (JP)

( * ) Notice: Subject to any disclaimer, the term of this patent is extended or adjusted under 35 U.S.C. 154(b) by 136 days.

(21) Appl. No.: 15/892,095

(22) Filed: Feb. 8, 2018

(65) Prior Publication Data

US 2018/0223037 A1 Aug. 9, 2018

(30) Foreign Application Priority Data

Feb. 8, 2017 (GB) .................................. 1702096.7

(51) Int. Cl.
| | |
|---|---|
| C08G 81/00 | (2006.01) |
| C08G 61/12 | (2006.01) |
| H01M 4/60 | (2006.01) |
| H01B 1/12 | (2006.01) |
| C08J 3/24 | (2006.01) |
| H01M 2/16 | (2006.01) |
| H01M 10/0565 | (2010.01) |
| H01M 10/052 | (2010.01) |
| C08G 61/02 | (2006.01) |

(52) U.S. Cl.
CPC .......... *C08G 61/126* (2013.01); *C08G 81/00* (2013.01); *C08J 3/24* (2013.01); *H01B 1/128* (2013.01); *H01M 4/604* (2013.01); *H01M 4/606* (2013.01); *H01M 4/608* (2013.01); *C08G 61/02* (2013.01); *C08G 61/12* (2013.01); *C08G 2261/124* (2013.01); *C08G 2261/126* (2013.01); *C08G 2261/143* (2013.01); *C08G 2261/146* (2013.01); *C08G 2261/149* (2013.01); *C08G 2261/1412* (2013.01); *C08G 2261/1424* (2013.01); *C08G 2261/18* (2013.01); *C08G 2261/228* (2013.01); *C08G 2261/31* (2013.01); *C08G 2261/3142* (2013.01); *C08G 2261/516* (2013.01); *C08G 2261/75* (2013.01); *C08G 2261/76* (2013.01); *C08G 2261/90* (2013.01); *H01M 2/1653* (2013.01); *H01M 10/052* (2013.01); *H01M 10/0565* (2013.01); *H01M 2300/0082* (2013.01)

(58) Field of Classification Search
USPC ........................................................ 525/389
See application file for complete search history.

(56) References Cited

U.S. PATENT DOCUMENTS

| | | | |
|---|---|---|---|
| 2002/0028887 A1 | 3/2002 | Hirano et al. | |
| 2004/0087727 A1 | 5/2004 | Hirano et al. | |
| 2011/0281197 A1 | 11/2011 | Daikoku et al. | |

FOREIGN PATENT DOCUMENTS

| | | |
|---|---|---|
| CN | 103319378 A | 9/2013 |
| CN | 104072727 A | 10/2014 |
| JP | 2009-143975 A | 7/2009 |

OTHER PUBLICATIONS

Combined Search and Examination Report for British Application No. 1702096.7, dated Aug. 1, 2017.

*Primary Examiner* — Terressa Boykin
(74) *Attorney, Agent, or Firm* — Wolf, Greenfield & Sacks, P.C.

(57) ABSTRACT

A method of forming a crosslinked polymer and an anion, the method comprising the step of reacting a first polymeric substituent comprising a nucleophilic group and a second polymeric substituent comprising an electrophilic group wherein the first polymeric substituent is a substituent of a first polymer and the second polymeric substituent is a substituent of the first polymer or a second polymer. The first and second polymers may be non-conjugated or conjugated. The crosslinked polymers may be used in electrochemical devices, for example battery cells.

20 Claims, 4 Drawing Sheets

METHOD OF FORMING AND USE OF A CROSSLINKED POLYMER

RELATED APPLICATIONS

This application claims foreign priority benefits under 35 U.S.C. § 119(a)-(d) or 35 U.S.C. § 365(b) of British application number 1702096.7, filed Feb. 8, 2017, the entirety of which is incorporated herein.

FIELD OF THE INVENTION

The present invention relates to a method of forming a crosslinked polymer and use of the crosslinked polymer.

BACKGROUND OF THE INVENTION

Electrochemical devices comprising mobile ions that move between two electrodes include battery cells, such as lithium ion battery cells, polymer-based battery cells, supercapacitors and light-emitting electrochemical cells.

Electrochemical devices may contain a polymer, for example a conjugated polymer in the anode or cathode of a polymer-based battery cell, for example as described in Journal of Power Sources, Volume 177, Issue 1, 15 Feb. 2008, Pages 199-204, in Chem. Rev. 2016, 116, 9438-9484 and in Chemical Reviews, 1997, Vol. 97, No. 1 209; as a separator or polyelectrolyte of a battery cell; or as a semiconducting material in a light-emitting electrochemical cell, for example as described in U.S. Pat. No. 5,682,043 and Materials Today, Volume 17, Number 5, June 2014.

WO 2006/016068 discloses a method for preparing an anionic conductive organic polymer material by reaction in a solution of a polymer containing halogen reactive groups with a bifunctional tertiary amine or a monofunctional secondary or tertiary amine.

SUMMARY OF THE INVENTION

The present inventors have found that a crosslinked polymer may be formed in which anions are released during the crosslinking process. The anions generated during the crosslinking process may enhance performance of an electrochemical device containing a crosslinked polymer generated by this process, and the crosslinked polymer may possess physical and/or electronic properties that are advantageous for use in an electrochemical cell or other applications.

Accordingly, in a first aspect the invention provides a method of forming a crosslinked polymer and an anion, the method comprising the step of reacting a first polymeric substituent comprising a nucleophilic group and a second polymeric substituent comprising an electrophilic group wherein the first polymeric substituent is a substituent of a first polymer and the second polymeric substituent is a substituent of the first polymer or a second polymer.

In a second aspect, the invention provides a crosslinked polymer obtainable by a method according to the first aspect.

In a third aspect, the invention provides an electrochemical device comprising a crosslinked polymer according to the second aspect.

The electrophilic substituent of the second polymer may be selected according to the required anion. In a fourth aspect, the invention provides a polymer comprising a repeat unit of formula (IVa):

$$-(Ar^3)-\qquad\qquad(IVa)$$

wherein $Ar^3$ is a $C_{6-20}$ arylene or 5-20 membered heteroarylene group which is substituted with at least one group of formula (IIa):

$$-(Sp^2)_y-(X^1)_b\qquad\qquad(IIa)$$

wherein $Sp^2$ is a spacer group; y is 0 or 1; b is at least 1 if y is 1 and b is 1 if y is 0; and $X^1$ is a group of formula $-SO_2-R^2$ or $-N(SO_2-R^2)_2$ wherein $R^2$ in each occurrence is independently selected from F and a $C_{1-12}$ hydrocarbyl group wherein one or more H atoms of the hydrocarbyl group may be replaced with F, and wherein the at least one group of formula (IIa) is the only substituent of the repeat unit of formula (IVa) or wherein the repeat unit comprises one or more other substituents.

DESCRIPTION OF THE DRAWINGS

The invention will now be described in more detail with reference to the drawings in which.

DETAILED DESCRIPTION OF THE INVENTION

Figure 1:
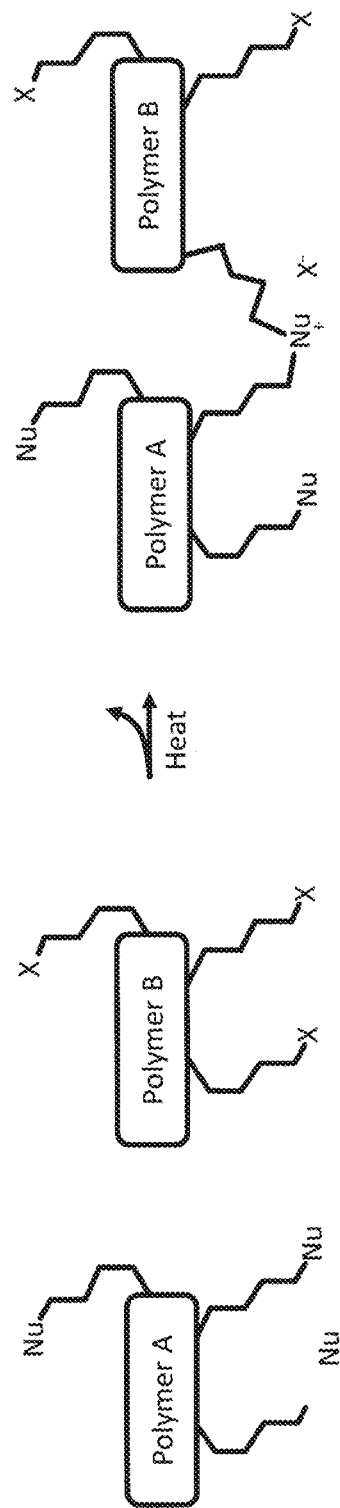
FIG. 1 illustrates a method of forming a crosslinked polymer by reaction of a first polymer substituted with a nucleophilic group and a second polymer substituted with an electrophilic group.

FIG. 1 is a schematic illustration of a method of forming a crosslinked polymer according to an embodiment of the invention.

A first polymer (Polymer A) in which the polymer backbone is substituted with a nucleophilic group Nu is reacted with a second polymer (Polymer B) in which the polymer backbone is substituted with an electrophilic leaving group X.

The reaction results in crosslinking of Polymer A and Polymer B and formation of ion $X^-$.

The formation of ions $X^-$ may enhance performance of an electrochemical device containing the crosslinked polymer.

FIG. 1 illustrates reaction of a neutral nucleophilic group Nu to form an ionic, crosslinked polymer comprising cation $Nu^+$ covalently bound in the crosslinked polymer and anion $X^-$. In other embodiments, the nucleophilic group of the first polymer is an anionic group $Nu^{p-}$ wherein p is 1, 2 or 3, preferably 1, and the first polymer comprises a cation $M^{q+}$ wherein q is 1, 2 or 3 to balance the charge of the anionic group $Nu^{p-}$. The valency of the cation may or may not match the valency of the anion. Preferably, p and q are both 1. In the case where p is 1, the electrophilic group X reacts with nucleophilic group $Nu^-$ form a neutral crosslinked polymer comprising neutral group Nu covalently bound in the crosslinked polymer and free ionic species $M^{q+}(X^-)q$. In the case where p is 2 or 3, the reaction results in a crosslinked polymer comprising anionic group Nu covalently bound in the crosslinked polymer and free ionic species $M^{q+}(X^-)q$ FIG. 1 illustrates reaction of a first polymer substituted with a nucleophilic substituent and a second polymer substituted with an electrophilic substituent. In other embodiments, the backbone of the first polymer may be substituted with an electrophilic group X as well as a neutral nucleophilic group Nu or anionic nucleophilic group $Nu^{p-}$, in which case the second polymer may or may not be present during the crosslinking reaction.

The first substituent may be provided as a substituent of a first repeat unit of the first polymer and/or as an end group of the first polymer.

The second substituent may be provided as a substituent of a second repeat unit of the first polymer and/or as an end group of the first polymer, or as a substituent of a second repeat unit of the second polymer and/or as an end group of the second polymer.

The first polymer may be a homopolymer or a copolymer comprising two or more different repeat units.

The first polymer may be a homopolymer wherein each repeat unit of the homopolymer is a first repeat unit substituted with at least one first substituent comprising a nucleophilic group and/or wherein first substituents are provided as end groups of the homopolymer.

The first polymer may be a copolymer wherein the copolymer comprises at least one first repeat unit substituted with at least one first substituent and/or wherein first substituents are provided as end groups of the copolymer. In the case of a copolymer comprising the first repeat units, the first repeat units may make up 1-99 mol %, optionally 1-50 mol %, of the repeat units of the copolymer.

The second polymer may be a homopolymer wherein each repeat unit of the homopolymer is a second repeat unit substituted with at least one second substituent comprising an electrophilic group and/or wherein second substituents are provided as end groups of the homopolymer.

The second polymer may be a copolymer wherein the copolymer comprises at least one second repeat unit substituted with at least one second substituent and/or wherein second substituents are provided as end groups of the copolymer. In the case of a copolymer comprising the second repeat units, the second repeat units may make up 1-99 mol %, optionally 1-50 mol %, of the repeat units of the copolymer.

The first polymer or second polymer may each independently be a homopolymer or copolymer wherein repeat units of the polymer are not substituted with the first or second substituent and wherein the first substituent and/or second substituent are present as polymer end groups.

The number of repeat units substituted with a first substituent or second substituent may be selected according to the desired extent of crosslinking.

The first polymer and/or the second polymer may be a linear or branched polymer. Branched polymers having first substituent or second substituent end groups may undergo a greater degree of crosslinking than corresponding linear polymers.

Preferably, the first substituent has formula (I):

Wherein $Sp^1$ is a first spacer group; x is 0 or 1; Nu is the nucleophilic group; a is at least 1 if x is 1 and a is 1 if x is 0.

If x is 0 then Nu is bound directly to the backbone of the first polymer. If x is 1 then Nu is spaced apart from the first polymer backbone.

Nu may be selected from neutral nucleophilic groups and ionic nucleophilic groups.

Exemplary neutral nucleophilic groups include, without limitation, groups selected from —N(R$^1$)$_2$, —P(R$^1$)$_2$—OH, —SH and monocyclic or polycyclic heteroaromatic groups consisting of aromatic ring atoms selected from C and N atoms which may be unsubstituted or substituted with one or more substituents, wherein R$^1$ in each occurrence is independently H or a substituent, preferably H or a $C_{1-20}$ hydrocarbyl groups.

Heteroaromatic nucleophilic groups include, without limitation, 5-membered and 6-membered heteroaromatic rings of C and N atoms, for example imidazole and pyridine. An heteroaromatic nucleophilic group as described herein is bound to the polymer backbone or, if present, to $Sp^1$ through an aromatic carbon atom of the imidazole. The or each substituent of a heteroaromatic nucleophilic group as described herein, if present, is optionally a $C_{1-20}$ hydrocarbyl group.

Anionic nucleophilic groups as described herein may be Exemplary anionic nucleophilic groups include, without limitation, groups selected from —O$^-$, —S$^-$, —COO$^-$ and —O—COO$^-$, —P(O)(O$^-$)$_2$, P(O)R(O$^-$) wherein R is a $C_{1-12}$ hydrocarbyl group. In the case where the first polymer comprises anionic nucleophilic groups, the polymer comprises a cation $M^{q+}$ balancing the charges of the anions, wherein q is 1, 2 or 3, preferably 1. $M^{q+}$ may be a metal cation, $NH_4^+$ or an organic cation. Preferably, metal cations $M^+$ are alkali metal cations.

Preferred organic cations are organic quaternary ammonium cations, optionally tetraalkylammonium cations.

Hydrocarbyl groups as described herein include, without limitation, alkyl; unsubstituted phenyl; and phenyl substituted with one or more $C_{1-12}$ alkyl groups.

Preferably, $Sp^1$ is a group of formula (III):

wherein $Ar^1$ and $Ar^2$ are each independently an arylene or heteroarylene group which may be unsubstituted or substituted with one or more substituents; Alk is a branched, linear or cyclic $C_{1-20}$ alkylene group, preferably a branched, linear or cyclic $C_{2-20}$ alkylene group, wherein one or more non-adjacent, non-terminal C atoms of the alkylene group may be replaced with O, C=O, COO or —Si(R$^1$)$_2$—; and f and g are each independently 0 or a positive integer, preferably 0 or 1.

By a "non-terminal C atom" of an alkylene group or of an alkyl group as used herein is meant a carbon atom of the alkylene group or alkyl group other than the or each carbon atom of a methyl group of a branched alkylene group or the or each carbon atom of a methyl group of a linear or branched alkyl group.

Where present, substituents of $Ar^1$ and $Ar^2$ are optionally selected from $C_{1-12}$ alkyl and $C_{1-12}$ alkoxy.

Optionally, the second substituent has formula (II):

wherein $Sp^2$ is a second spacer group; y is 0 or 1; X is the electrophilic leaving group; b is at least 1 if y is 1 and b is 1 if y is 0.

$Sp^2$ may be selected from spacer groups described with reference to $Sp^1$, preferably a spacer group of formula (III).

X is optionally selected from the group consisting of Cl, Br, I, —CO(=O)R$^2$, —C(=O)OC(=O)R$^2$, —O—SO$_2$—R$^2$ and —N(SO$_2$—R$^2$)$_2$ wherein R$^2$ in each occurrence is independently selected from F and $C_{1-12}$ hydrocarbyl wherein one or more H atoms of the hydrocarbyl may be replaced with F.

Preferred groups of formula —O—SO$_2$—R$^2$ are mesylate, esylate, triflate, besylate and tosylate.

A preferred group of formula —N(SO$_2$—R$^2$)$_2$ is bis(trifluoromethane)sulfonimide (TFSI) The backbone of the first and second polymer may each be conjugated or non-conjugated.

The backbones may be selected according to the intended application of the crosslinked polymer.

The backbone of the first polymer may be conjugated or non-conjugated.

The backbone of the second polymer may be conjugated or non-conjugated.

In some embodiments, the first and second polymers are both conjugated polymers.

In some embodiments, the first and second polymers are both non-conjugated polymers.

In some embodiments, one of the first and second polymers is a conjugated polymer and the other of the first and second polymers is a non-conjugated polymer.

By "conjugated polymer" as used herein is meant a polymer comprising repeat units in the polymer backbone that are directly conjugated to adjacent repeat units in the polymer backbone. There may be no breaks in conjugation along the polymer backbone, or conjugation along the backbone may be broken by non-conjugating repeat units within or between repeating units of the conjugated polymer. Preferred conjugated polymers as described herein comprise monocyclic or polycyclic aromatic or heteroaromatic groups conjugated together in the polymer backbone.

Conjugated polymers as described herein may be formed by methods including, without limitation, polymerisation of monomers comprising leaving groups (groups other than H) that leave upon polymerisation of the monomers to form conjugated repeat units; oxidative polymerisation; and direct (hetero)arylation.

Exemplary polymerization methods include, without limitation, Yamamoto polymerization as described in, for example, T. Yamamoto, "Electrically Conducting And Thermally Stable pi-Conjugated Poly(arylene)s Prepared by Organometallic Processes", Progress in Polymer Science 1993, 17, 1153-1205, the contents of which are incorporated herein by reference; Suzuki polymerization as described in, for example, WO 00/53656, WO 2003/035796, and U.S. Pat. No. 5,777,070, the contents of which are incorporated herein by reference; and direct (hetero)arylation as disclosed in, for example, Direct (Hetero)arylation Polymerization: Simplicity for Conjugated Polymers Synthesis", Chem. Rev. 2016, 116, 14225-14274, the contents of which are incorporated herein by reference.

A non-conjugated polymer as described herein is preferably free of any sp$^2$ hybridised carbon atoms in the polymer backbone.

The crosslinked polymer may be a conjugated, neutral polymer; a conjugated, ionic polymer, a non-conjugated, ionic polymer or a non-conjugated, neutral polymer. The backbone of a first and second polymer, and nucleophilic, electrophilic and any other substituents of the first and second polymer may be selected according to the required properties of the crosslinked polymer.

A non-conjugated polymer optionally has a backbone comprising or consisting of ethylene or C$_{1-5}$ alkylene oxide repeat units, optionally repeat units derived from ethylene, acrylate (including alkylacrylate) and styrene monomers; and repeat units derived from ethylene oxide or propylene oxide monomers.

A non-conjugated first polymer or non-conjugated second polymer may comprise or consist of repeat units selected from formulae (IV) and (V):

(IV)

(V)

wherein R$^{20}$-R$^{25}$ are each independently selected from H or a substituent and m is at least 2, optionally 2-5.

Substituents R$^{20}$-R$^{25}$ may be selected from C$_{1-20}$ hydrocarbyl, optionally C$_{1-20}$ alkyl; phenyl which is unsubstituted or substituted with one or more C$_{1-12}$ alkyl groups; groups of formula —COOR$^{26}$ wherein R$^{26}$ is a C$_{1-12}$ alkyl group; pyrrolidone which is unsubstituted or substituted with one or more C$_{1-12}$ alkyl groups; cyano; a first substituent comprising a nucleophilic group; and a second substituent comprising an electrophilic group.

Figure 2:
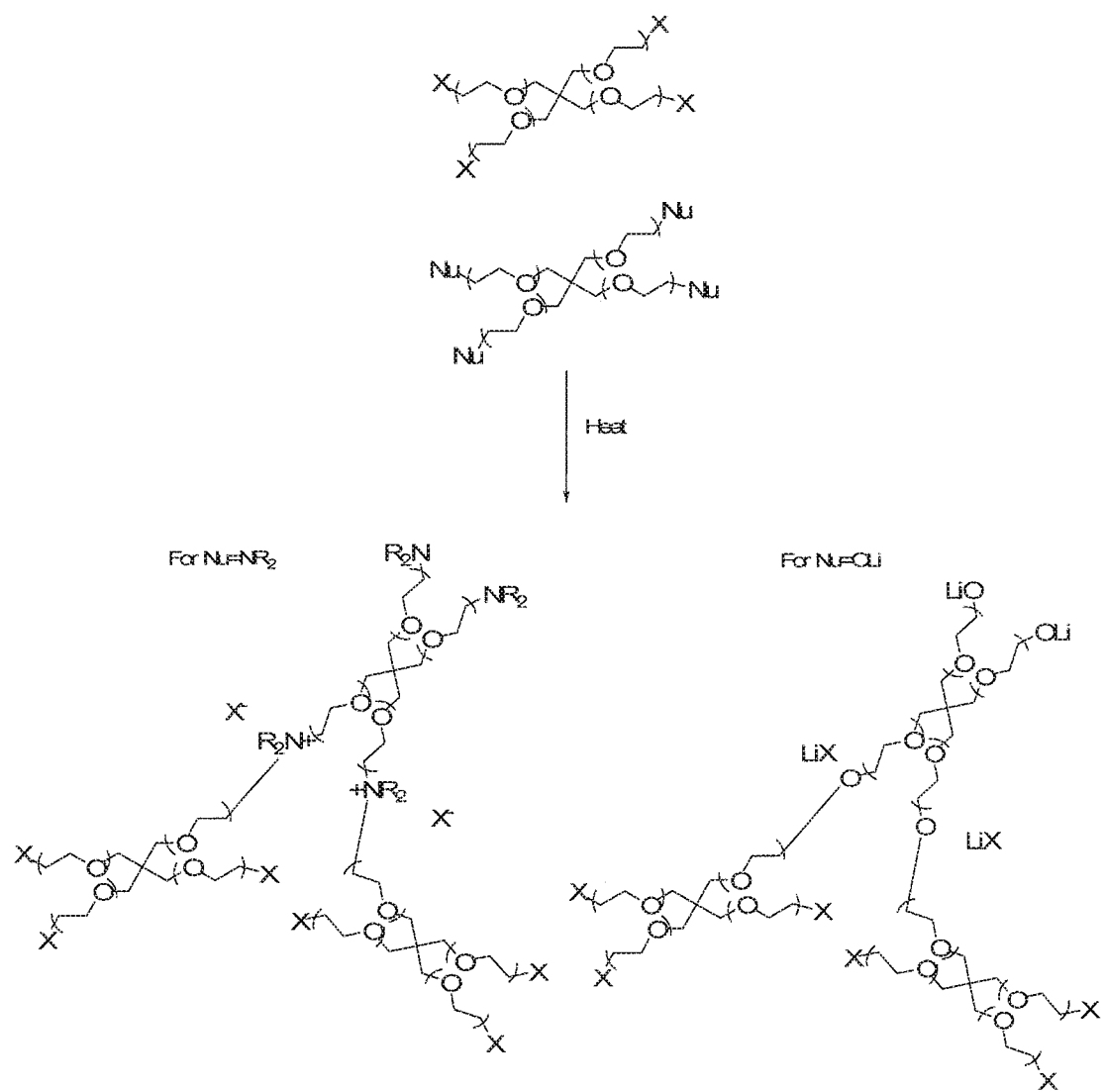
FIG. 2 illustrates a method of FIG. 1 in which the first and second polymer are each a non-conjugated polymer and in which the first and second polymers have nucleophilic end group substituents and electrophilic end group substituents respectively.

FIG. 2 illustrates crosslinking of a non-conjugated first polymer and a non-conjugated second polymer wherein the first and second polymers are branched polymers comprising ethylene oxide repeat units. End groups of the branched first and second polymers comprise a nucleophilic group and an electrophilic group respectively.

Preferred conjugated polymers comprise at least one repeat unit of formula (IV):

(IV)

wherein Ar$^3$ is a C$_{6-20}$ arylene or 5-20 membered heteroarylene group.

Exemplary C$_{6-20}$ aromatic repeat units include, without limitation, phenylene, naphthalene, anthracene, fluorene, acenaphthene and phenanthrene repeat units, each of which may be unsubstituted or substituted with one or more substituents. Exemplary 5-20 membered heteroarylene repeat units include 5-20 membered monocyclic or polycyclic heteroarylene groups having carbon ring atoms and one or more ring atoms selected from O, S and N, preferably S and/or N such as thiophene, pyridine, quinoline, thiophene, benzothiophene, benzothiadiazole, benzotriazole, carbazole, triazine, azafluorene, naphthalenediimide, perylenediimide, thienopyrroledione, phtalimides and quinoxaline repeat units, each of which may be unsubstituted or substituted with one or more substituents.

One or both of the first polymer and the second polymer may comprise one or more repeat units selected from formulae (V)-(IX):

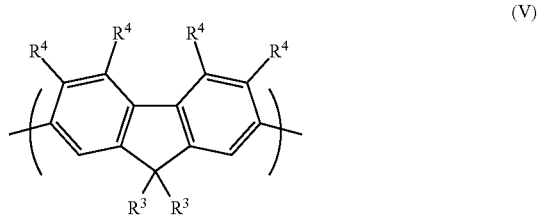

(V)

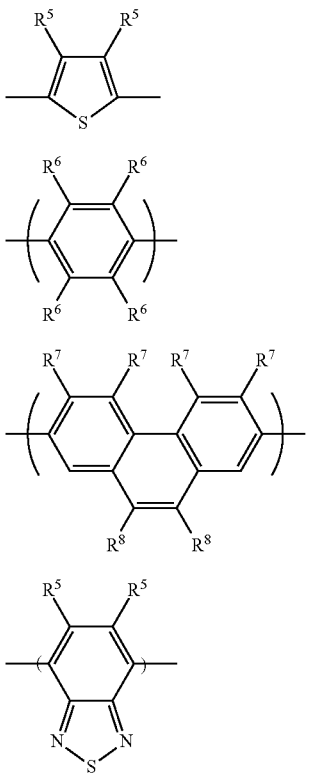

wherein R³ in each occurrence is the same or different and is a substituent and R⁴, R⁵, R⁶, R⁷ and R⁸ in each occurrence is the same or different and is H or a substituent.

Repeat units of formula (V) are particularly preferred.

Preferably, each R³ is independently selected from the group consisting of: $C_{1-20}$ alkyl wherein one or more non-adjacent, non-terminal carbon atoms may be replaced with O, S, —Si(R⁹)₂—C═O or COO wherein R⁹ in each occurrence is independently a substituent;
a group of formula -(Ar⁴)$_n$ wherein Ar⁴ in each occurrence is an aryl or heteroaryl group which is unsubstituted or substituted with one or more substituents and n is at least 1;
a first substituent comprising a nucleophilic group; and
a second substituent comprising an electrophilic group.

R⁹ is preferably a $C_{1-20}$ hydrocarbyl group.

Ar⁴ is preferably phenyl.

Substituents of Ar⁴, if present, are preferably selected from $C_{1-20}$ alkyl wherein one or more non-adjacent, non-terminal carbon atoms may be replaced with S, —Si(R⁹)₂— C═O or COO; $C_{1-20}$ alkoxy; and an oligo- or polyether group.

An oligoether or polyether group as described herein is a group comprising at least two ether groups, preferably a group comprising or consisting of formula —(OCH₂CH₂) n-H wherein n is at least 2, optionally 2-10.

n is preferably 1, 2 or 3.

Optionally, substituents R⁴, R⁵, R⁶, R⁷ and R⁸, if present, are selected from the group consisting of:
F,
CN;
NO₂;
$C_{1-20}$ alkyl wherein one or more non-adjacent, non-terminal carbon atoms may be replaced with S, —Si(R⁹)₂—C═O or COO wherein R⁹ in each occurrence is independently a substituent;
$C_{1-20}$ alkoxy or an oligo- or polyether group;
a group of formula -(Ar⁴)$_n$ wherein Ar⁴ in each occurrence is an aryl or heteroaryl group which is unsubstituted or substituted with one or more substituents and n is at least 1;
a first substituent comprising a nucleophilic group; and
a second substituent comprising an electrophilic group.

Preferably, R⁴, R⁵, R⁶, R⁷ and R⁸ are each independently selected from H, $C_{1-20}$ alkyl and phenyl which is unsubstituted or substituted with one or more $C_{1-12}$ alkyl groups.

Preferably, each R⁴ is H.

Preferably, the first polymer comprises a repeat unit of formula (V) wherein at least one R³ is a first substituent comprising a nucleophilic group.

Preferably, the second polymer comprises a repeat unit of formula (V) wherein at least one R³ is a second substituent comprising an electrophilic group.

Figure 3:
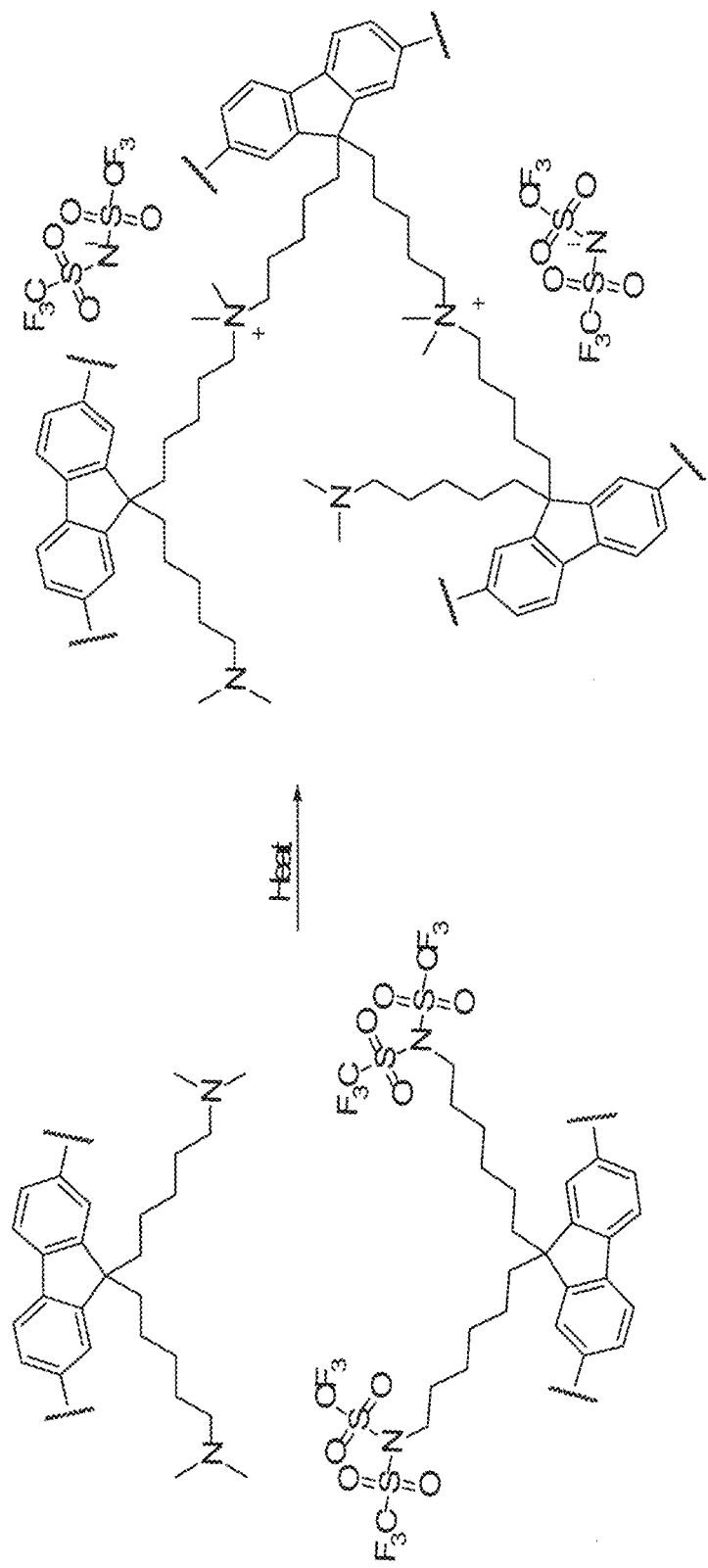
FIG. 3 illustrates a method of FIG. 1 in which the first and second polymer are each a conjugated polymer and in which the first and second polymers each comprise a repeat unit substituted with nucleophilic end group substituents and electrophilic end group substituents respectively.

FIG. 3 illustrates a crosslinking reaction according to an embodiment of the invention between a first conjugated polymer and second conjugated polymer comprising fluorene repeat units substituted with nucleophilic and electrophilic groups respectively. The anion that is formed in the crosslinking reaction may be selected according to the requirements of the device in which the crosslinked polymer is to be used. In FIG. 3, the ion formed is TFSI.

Conjugated polymers as described herein may comprise an amine repeat unit comprising a N atom in the polymer backbone, optionally a repeat unit of formula (X) or (XI):

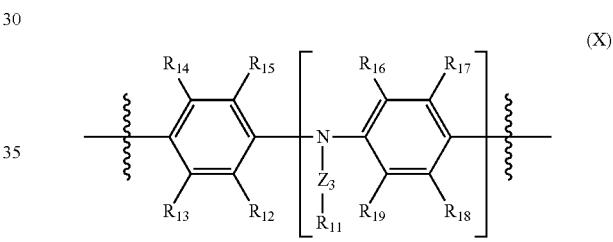

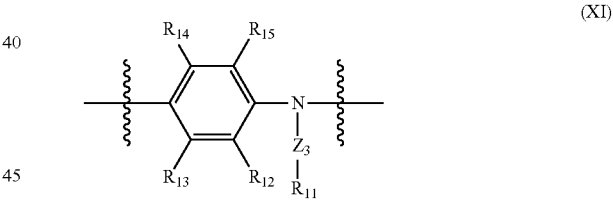

wherein $R_{11}$ to $R_{19}$ are independently selected from hydrogen, $C_{1-20}$-alkyl, $C_{1-20}$-alkyl ether, $C_{1-20}$-carboxyl, $C_{1-20}$-carbonyl, $C_{1-20}$-ester, $C_{6-18}$-aryl, $C_{5-18}$-heteroaryl; n is greater than or equal to 1 and preferably 1 or 2; and $Z_3$ is selected from a single bond, $C_{1-20}$-alkylene, optionally substituted $C_{6-18}$-arylene, or an optionally substituted $C_{5-18}$-heteroarylene group.

In preferred embodiments, $R_{12}$ to $R_{19}$ are independently selected from hydrogen, $C_{1-12}$-alkyl, $C_{1-12}$-alkyl ether, $C_{1-12}$-carboxyl, $C_{1-12}$-carbonyl, $C_{1-12}$-ester, optionally substituted $C_{6-12}$-aryl, and optionally substituted $C_{5-12}$-heteroaryl groups; $Z_3$ is selected from a single bond, an optionally substituted $C_{1-12}$-alkylene, optionally substituted $C_{1-12}$-oxyalkylene, optionally substituted $C_{6-12}$-arylene, or an optionally substituted $C_{6-12}$-heteroarylene group. In one embodiment, $Z_3$ is an optionally substituted phenylene group, with the residue $R_{11}$ being preferably an oligo- or polyether group having at least two alkoxy repeat units and being located in m- or p-position relative to the arylamino group.

All repeat units of a polymer comprising a repeat unit of formula (X) or (XI) may be repeat units of formula (X) or (XI), or the repeat units may comprise one or more repeat units of formula (X) or (XI) and at least one further repeat unit, preferably one or more repeat units of formula (IV), more preferably one or more repeat units selected from formulae (V)-(IX).

First and second polymers as described herein preferably have a polystyrene-equivalent number-average molecular weight (Mn) measured by gel permeation chromatography in the range of about $1 \times 10^3$ to $1 \times 10^8$, and more preferably $1 \times 10^3$ to $5 \times 10^6$. The polystyrene-equivalent weight-average molecular weight (Mw) of the first and second polymers described herein may be $1 \times 10^3$ to $1 \times 10^8$, and preferably $1 \times 10^4$ to $1 \times 10^7$.

The crosslinked polymer is formed by reacting the nucleophilic group with the electrophilic group to crosslink the first polymer or, if a second polymer is present, to crosslink the first and second polymers.

The reaction may be performed with or without heating. If heating is used it is optionally at a temperature of 50° C. or more, preferably at a temperature in the range of 50° C.-200° C. The skilled person will be aware of the temperature required for any specific combination of electrophilic group and nucleophilic group.

The reaction may be carried out by heating the first polymer and, if present, the second polymer wherein at least some or all of the first and second polymers are in the solid state. In this case, the composition is preferably heated at a temperature higher than the glass transition temperature of the first polymer and, if the second polymer is present, higher than the glass transition temperature of the second polymer.

In some embodiments, a layer comprising or consisting of the first, and optionally second, polymer may be formed on a substrate and the crosslinked layer may be delaminated from the substrate.

In other embodiments, the layer comprising or consisting of the first, and optionally second, polymer may be formed on an underlying layer that is to form part of a device containing the crosslinked polymer. In situ formation of a crosslinked layer in this way may avoid difficulties in processing of a low solubility crosslinked material.

The thickness of a layer to be crosslinked as described herein is optionally in the range of 0.05 to 500 m, preferably between 1 to 150 km.

Applications of the crosslinked polymer include, without limitation, use as the active material in the anode and/or cathode of a polymer battery; as a polymer electrolyte of a battery; or as a separator of a battery.

Figure 4:
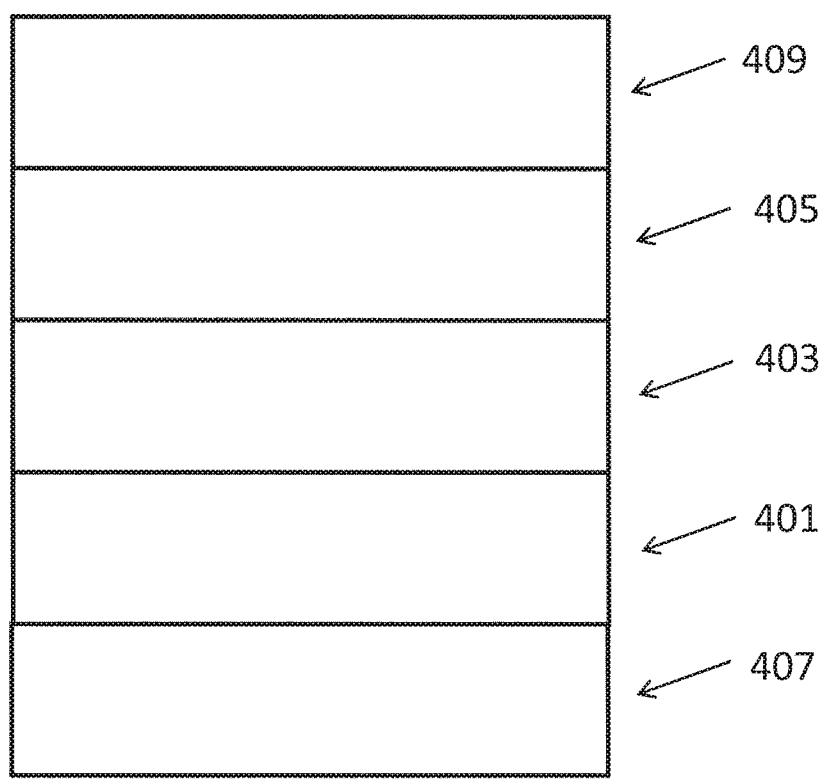
FIG. 4 is a schematic illustration of a conjugated polymer battery.

FIG. 4 illustrates a battery cell 400 comprising an anode 401, a cathode 405, a porous separator 403 between the anode and the cathode, an anode current collector 407 in contact with the anode and a cathode current collector 409 in contact with the cathode.

A liquid electrolyte is absorbed within the separator. Exemplary liquid electrolytes are 1-butyl-1-methylpyrrolidinium bis(trifluoromethylsulfonyl)imide and alkali metal salt/organic solvent based electrolytes, for example lithium hexafluorophosphate in propylene carbonate.

One or more of the anode 401, the cathode 405 and the separator may comprise a crosslinked polymer as described herein.

A crosslinked active polymer as described herein for use in the anode or cathode of a polymer battery may comprise repeat units as disclosed in Chem. Rev. 2016, 116, 9438-9484 and Chemical Reviews, 1997, Vol. 97, No. 1 209, the contents of which are incorporated herein by reference.

A crosslinked polymer as described herein which is capable of undergoing reversible n-doping (an "n-type" polymer) may be used in the anode of a polymer battery cell. n-type polymers as described herein preferably have a LUMO level measured by square wave voltammetry of between −4.5 and −1.5 eV, more preferably between −3.5 and −2.0 eV A crosslinked polymer as described herein which is capable of undergoing reversible p-doping (a "p-type" polymer) may be used in the cathode of a polymer battery cell. p-type polymers as described herein preferably have a HOMO level measured by square wave voltammetry of between −4.5 and −6.5 eV, more preferably between −4.8 and −6 eV.

In the case where the anode or cathode of a polymer battery comprises or consists of a crosslinked polymer as described herein, at least one and preferably both of the first and second polymers are conjugated polymers.

A separator of a lithium ion battery or a polymer battery is optionally a crosslinked polymer formed by crosslinking first and second non-conjugated polymers as described herein.

A polyelectrolyte of a lithium ion battery or a polymer battery is optionally a crosslinked polymer formed by cross-linking first and second polymers as described herein wherein at least one, preferably both, of the first and second polymers are non-conjugated.

In one embodiment, the battery is a polymer battery and one or both of the anode and cathode comprises a crosslinked polymer as described herein. A crosslinked polymer as described herein comprised in an anode or cathode of a polymer battery is preferably formed by crosslinking a conjugated first polymer and, if present a conjugated second polymer.

In another embodiment, the separator may comprise or consist of a crosslinked polymer as described herein in which case the battery may or may not be a polymer battery comprising a polymeric anode and cathode. A crosslinked polymer as described herein comprised in a separator of a battery is preferably formed by crosslinking a non-conjugated first polymer and, if present a non-conjugated second polymer.

The separator 203 and liquid electrolyte of a battery described with reference to FIG. 2 may be replaced by a crosslinked polymer electrolyte. The crosslinked polymer electrolyte may be a solid or a gel.

EXAMPLES

Measurements

Square wave voltammetry measurements as described herein may be performed using a CHI660D Electrochemical workstation with software (IJ Cambria Scientific Ltd)), a CHI 104 3 mm glassy carbon disk working electrode (IJ Cambria Scientific Ltd)); a platinum wire auxiliary electrode; an Ag/AgCl reference electrode (Havard Apparatus Ltd); acetonitrile as cell solution solvent (Hi-dry anhydrous grade-ROMIL); toluene as sample preparation solvent (Hi-dry anhydrous grade); ferrocene as reference standard (FLUKA); and tetrabutylammoniumhexafluorophosphate (FLUKA) as cell solution salt. For sample preparation, the polymer is spun as thin film (~20 nm) onto the working electrode and the dopant material is measured as a dilute solution (0.3 w %) in toluene. The measurement cell contains the electrolyte, a glassy carbon working electrode onto which the sample is coated as a thin film, a platinum counter electrode, and a Ag/AgCl reference glass electrode. Ferrocene is added into the cell at the end of the experiment as reference material (LUMO (ferrocene)=−4.8 eV).

Polymer Synthesis

Polymers were formed by polymerisation as described in WO 00/53656 of monomers in the molar amounts given in Table 1.

mixture in CHCl$_3$/MeOH (9:1). The film was dried at 80° C. for 10 minutes and the weight of the plate was measured. The plate was then heated at 150° C. on a hotplate in a nitrogen atmosphere for 60 minutes, washed with CHCl$_3$/MeOH (9:1) (2 ml), dried at 80° C. for 10 mins and weighed again.

TABLE 1

| Monomer | Polymer 1 (mol %) | Polymer 2 (mol %) |
|---|---|---|
| benzothiadiazole dibromide | 50 | 50 |
| 9,9-di-n-octylfluorene dibromide | 25 | — |
| 9,9-bis(dimethylaminoethyl)fluorene dibromide | 25 | — |
| 9,9-bis(methoxyethoxyethyl)fluorene dibromide | — | 25 |
| 9,9-dihexylfluorene dibromide | — | 25 |

Example 1

A film comprising a mixture of Polymer 1 and Polymer 2 in a 1:1 weight ratio was formed on a glass plate by drop-casting 0.3 ml of a 1 wt % solution of the polymer Comparative Example 1

Films of Polymer 1 and Polymer 2 alone were formed and treated as described for Example 1.

Comparative Example 2

A film of a mixture of Polymer 1 and Polymer 2 was formed and treated as described in Example 1 except that the film was not heated.

Results are set out in Table 2. The higher material retention of Example 1 compared to any of the comparative examples is indicative of crosslinking of the polymers of Example 1.

TABLE 2

| | Polymers | Heating conditions | Initial loading (mg) | Loading after washing (mg) | Material retention (%) |
|---|---|---|---|---|---|
| Comparative Example 1 | Polymer 1 | 150° C. 60 min | 2.91 | 0.1 | 3 |
| Comparative Example 2 | Polymer 2 | 150° C. 60 min | 3.62 | 0.25 | 7 |
| Comparative Example 3 | Polymer 1: Polymer 2 1:1 wt blend | No heating | 5.28 | 0.28 | 5 |
| Example 1 | Polymer 1: Polymer 2 1:1 wt blend | 150° C. 60 min | 5.22 | 0.81 | 16 |

Example 2

40 mg of each compound illustrated in Scheme 1 were mixed as powders in a 1:1 weight ratio in a vial. The vial was heated on a hotplate at 150° C. for 5 minutes.

The mixture first melted then re-solidified indicating an increase in the melting point of the mixture.

A sample of the cooled solid (31 mg) was transferred to a vial and toluene (1 ml) was added and stirred for 5 minutes after which the toluene layer was syringed off. The resulting powder was dried at 100° C. for 5 minutes and then weighed again to obtain 23.4 mg of a toluene insoluble product. The starting materials are highly soluble in toluene, which indicates that 75 weight % of the starting materials underwent a reaction as shown in Scheme 1 to form an insoluble product.

Although the present invention has been described in terms of specific exemplary embodiments, it will be appreciated that various modifications, alterations and/or combinations of features disclosed herein will be apparent to those skilled in the art without departing from the scope of the invention as set forth in the following claims.

The invention claimed is:

1. A method of forming a crosslinked polymer and an anion, the method comprising the step of reacting a first polymeric substituent comprising a nucleophilic group and a second polymeric substituent comprising an electrophilic group wherein the first polymeric substituent is a substituent of a first polymer and the second polymeric substituent is a substituent of the first polymer or a second polymer.

2. The method according to claim 1 wherein the first polymeric substituent is a substituent of the first polymer and the second polymeric substituent is a substituent of the second polymer.

3. The method according to claim 1 wherein the first polymeric substituent has formula (I):

-(Sp¹)ₓ-(Nu)ₐ     (I)

Scheme 1

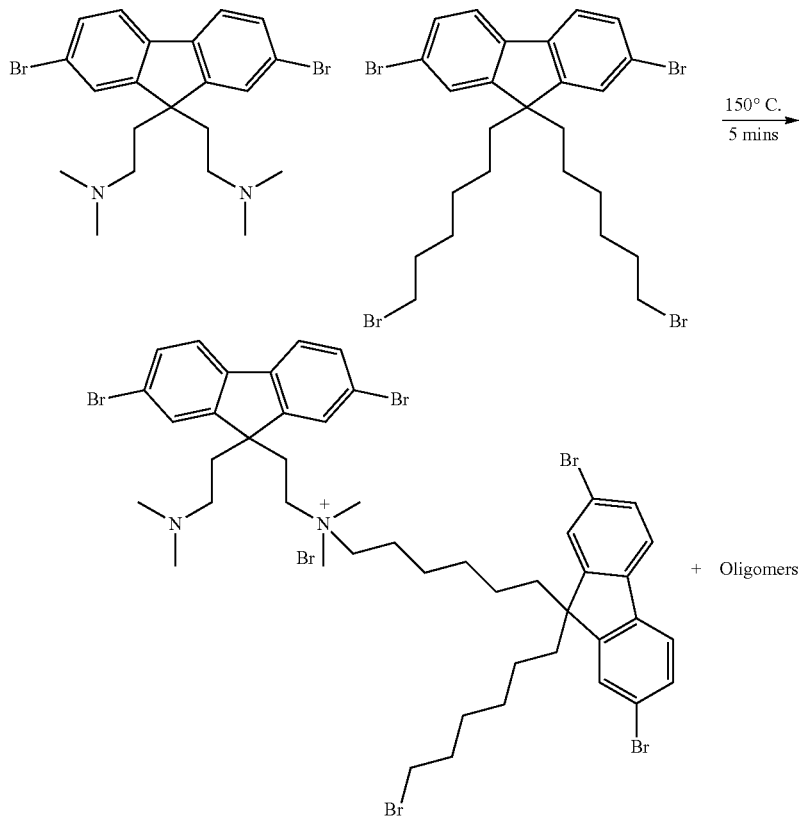

wherein Sp$^1$ is a first spacer group; x is 0 or 1; Nu is the nucleophilic group; a is at least 1 if x is 1 and a is 1 if x is 0.

4. The method according to claim 1 wherein the nucleophilic group is a neutral nucleophilic group.

5. The method according to claim 4 wherein the neutral nucleophilic group is selected from the group consisting of —N(R$^1$)$_2$, —P(R$^1$)$_2$—OH, —SH and monocyclic or polycyclic heteroaromatic groups consisting of aromatic ring atoms selected from C and N atoms which are unsubstituted or substituted with one or more substituents, wherein R$^1$ in each occurrence is independently H or a substituent.

6. The method according to claim 1 wherein the nucleophilic group is an anionic nucleophilic group.

7. The method according to claim 6 wherein the anionic nucleophilic group is selected from the group consisting of hydroxide, sulphide, —COO$^-$, —O—COO$^-$, —P(O)(O$^-$)$_2$, and P(O)R(O$^-$) wherein R is a C$_{1-12}$ hydrocarbyl group.

8. The method according to claim 1 wherein the second polymeric substituent has formula (II):

-(Sp$^2$)$_y$-(X)$_b$    (II)

wherein Sp$^2$ is a second spacer group; y is 0 or 1; X is the electrophilic group; b is at least 1 if y is 1 and b is 1 if y is 0.

9. The method according to claim 8 wherein X is selected from the group consisting of Cl, Br, I, —O—SO$_2$—R$^2$ and —N(SO$_2$—R$^2$)$_2$ wherein R$^2$ in each occurrence is independently selected from F and C$_{1-12}$ hydrocarbyl wherein one or more H atoms of the hydrocarbyl may be replaced with F.

10. The method according to claim 1 wherein the second polymeric substituent is a substituent of a second repeat unit of the first or second polymer.

11. The method according to claim 1 wherein the second polymeric substituent is an end group of the first or second polymer.

12. The method according to claim 1 wherein at least one of the first polymer and the second polymer is a conjugated polymer.

13. The method according to claim 12 wherein the conjugated polymer comprises at least one repeat unit of formula (IV):

-(Ar$^3$)-    (IV)

wherein Ar$^3$ is a C$_{6-20}$ arylene or 5-20 membered heteroarylene group which is unsubstituted or substituted with one or more substituents.

14. The method according to claim 1 wherein at least one of the first polymer and the second polymer is a non-conjugated polymer.

15. The method according to claim 1 comprising the step of heating a solid state layer comprising the first polymer and, if present, the second polymer.

16. A crosslinked polymer obtainable by a method according to claim 1.

17. An electrochemical device comprising a crosslinked polymer according to claim 16.

18. An electrochemical device according to claim 17 wherein the electrochemical device is a battery cell.

19. An electrochemical device according to claim 18 wherein the battery cell comprises an anode or a cathode comprising the crosslinked polymer.

20. A polymer comprising a repeat unit of formula (IVa):

-(Ar$^3$)-    (IVa)

wherein Ar$^3$ is a C$_{6-20}$ arylene or 5-20 membered heteroarylene group which is substituted with at least one group of formula (IIa):

-(Sp$^2$)$_y$-(X$^1$)$_b$    (IIa)

wherein Sp$^2$ is a spacer group; y is 0 or 1; b is at least 1 if y is 1 and b is 1 if y is 0; and X$^1$ is a group of formula —O-SO$_2$-R$^2$ or —N(SO$_2$—R$^2$)$_2$ wherein R$^2$ in each occurrence is independently selected from F and C$_{1-12}$ hydrocarbyl group wherein one or more H atoms of the hydrocarbyl group may be replaced with F, and wherein the at least one group of formula (IIa) is the only substituent of the repeat unit of formula (IVa) or wherein the repeat unit comprises one or more other substituents.

* * * * *